US008517303B2

(12) United States Patent
Dilmaghani et al.

(10) Patent No.: US 8,517,303 B2
(45) Date of Patent: Aug. 27, 2013

(54) INTEGRATED MULTIFUNCTIONAL POWERED WHEEL SYSTEM FOR AIRCRAFT

(75) Inventors: Homayoun Dilmaghani, Merenvielle (FR); Carsten Bohlen, Cornebarrieu (FR)

(73) Assignees: Airbus S.A.S. (FR); Airbus Operations GmbH (DE)

( * ) Notice: Subject to any disclaimer, the term of this patent is extended or adjusted under 35 U.S.C. 154(b) by 336 days.

(21) Appl. No.: 12/393,157

(22) Filed: Feb. 26, 2009

(65) Prior Publication Data
US 2009/0218440 A1     Sep. 3, 2009

Related U.S. Application Data

(60) Provisional application No. 61/067,586, filed on Feb. 29, 2008.

(30) Foreign Application Priority Data

Feb. 29, 2008  (DE) .......................... 10 2008 011 791

(51) Int. Cl.
*B64C 25/50* (2006.01)
(52) U.S. Cl.
USPC .................. 244/50; 244/100 R; 244/103 S
(58) Field of Classification Search
USPC .................. 244/50, 100 R, 103 R, 103 S
See application file for complete search history.

(56) References Cited

U.S. PATENT DOCUMENTS

| | | | | |
|---|---|---|---|---|
| 2,911,168 A | * | 11/1959 | Moreland | 244/50 |
| 3,807,664 A | * | 4/1974 | Kelly et al. | 244/50 |
| 3,874,619 A | | 4/1975 | Collins et al. | |
| 3,885,759 A | * | 5/1975 | Lear | 244/50 |
| 3,977,631 A | * | 8/1976 | Jenny | 244/50 |
| 4,659,039 A | * | 4/1987 | Valdes | 244/103 S |

(Continued)

FOREIGN PATENT DOCUMENTS

| | | |
|---|---|---|
| DE | 102004028464 | 12/2005 |
| DE | 102004053052 | 5/2006 |

(Continued)

OTHER PUBLICATIONS

Mitsubishi Motors (http://media.mitsubishi-motors.com/presserelease/e/corporate/detail 1321 .html).

*Primary Examiner* — Benjamin P Lee
(74) *Attorney, Agent, or Firm* — Lerner, David, Littenberg, Krumholz & Mentlik, LLP

(57) ABSTRACT

The invention relates to a powered wheel system for an aircraft, comprising at least one undercarriage with several rotatably held wheels, with the powered wheel system comprising two or more motors of which in each case at least one motor is coupled to at least one of the wheels, and comprising at least one control device that is coupled to the motors. A control device is equipped to control operation of the motors independently of each other as far as their respective rotary speeds and direction of rotation are concerned, so that the system is able, among other things, to effect taxiing; by means of rotary speed differentials on different motors to be able to steer the aircraft; prior to landing to bring the wheel circumference speeds to landing speed; and to boost the undercarriage brakes of the aircraft. Furthermore, by means of an improvement of the system according to the invention, the rotary speeds of the wheels may be determined with precision. The invention furthermore relates to a method for driving wheels of an aircraft.

23 Claims, 2 Drawing Sheets

(56) References Cited

U.S. PATENT DOCUMENTS

| | | | |
|---|---|---|---|
| 5,141,173 A * | 8/1992 | Lay | 244/2 |
| 5,190,247 A * | 3/1993 | Le Chatelier | 244/103 R |
| 7,226,018 B2 * | 6/2007 | Sullivan | 244/111 |
| 7,237,748 B2 * | 7/2007 | Sullivan | 244/111 |
| 7,891,609 B2 * | 2/2011 | Cox et al. | 244/121 |
| 2005/0224642 A1 * | 10/2005 | Sullivan | 244/111 |
| 2006/0038068 A1 * | 2/2006 | Sullivan | 244/111 |
| 2006/0293805 A1 | 12/2006 | Garcia | |
| 2008/0179146 A1 * | 7/2008 | Sullivan | 188/164 |
| 2008/0283660 A1 * | 11/2008 | Thompson | 244/75.1 |
| 2009/0114765 A1 * | 5/2009 | Cox et al. | 244/50 |
| 2009/0261197 A1 * | 10/2009 | Cox et al. | 244/50 |
| 2010/0006699 A1 * | 1/2010 | Sullivan | 244/111 |
| 2010/0276535 A1 * | 11/2010 | Charuel et al. | 244/50 |

FOREIGN PATENT DOCUMENTS

| | | |
|---|---|---|
| EP | 1867567 | 12/2007 |
| WO | 2006078322 | 7/2006 |
| WO | 2006138267 | 12/2006 |
| WO | 2007048164 | 5/2007 |

* cited by examiner

INTEGRATED MULTIFUNCTIONAL POWERED WHEEL SYSTEM FOR AIRCRAFT

CROSS-REFERENCE TO RELATED APPLICATIONS

This application claims the benefit of the filing date of U.S. Provisional Patent Application No. 61/067,586 filed Feb. 29, 2008, the disclosure of which is hereby incorporated herein by reference.

The invention relates to a powered wheel system for an aircraft, and to a method for driving wheels of an aircraft.

BACKGROUND OF THE INVENTION

Aircraft, and in particular aircraft that are not capable of vertical takeoff and landing, comprise undercarriages comprising several wheels. Normally, the wheels of such undercarriages are not actively driven nor are they made to rotate during the landing procedure, prior to the landing shock. However, there are printed prior art publications in which it has been proposed that wheels of undercarriages be driven so that, in particular, tyre wear as a result of friction during landing is minimised, and/or that the aircraft can be taxied. For example, WO 2006/078322 A2 describes a drive system for an aircraft comprising one or several nosewheel gear motors, which drive system is used to move the aircraft on the ground with precision, thus improving, for example, aircraft safety during taxiing. WO 2006/138267 A2 also shows a drive system for the nosewheel gear of an aircraft, which drive system is used in particular for taxiing and can in particular communicate with control devices that are situated outside the aircraft, and which drive system, furthermore, can, for example, be coupled to satellite navigation. In contrast to this, the further printed publication WO 2007/048164 A1 proposes a mechanism that can be used for driving a wheel of an aircraft, in particular in order to reduce tyre wear as a result of friction during landing, and to boost the brakes of the aircraft after the landing procedure by providing an antitorque movement.

The devices and systems shown in prior art are associated with a number of disadvantages. The largest shared disadvantage relates to the relatively high additional weight in return for a relatively modest number of additional functions gained, which functions are not available to a conventional aircraft. For example, an arrangement of motors on wheels of an undercarriage is only used in order to support the taxiing procedure and to drive an undercarriage wheel directly prior to landing. For example, the proposed systems do not make it possible to control the taxiing procedure entirely from the outside without the need to use the aircraft's own steering. For example, if automatic or semi-automatic taxiing is desired, this is achieved by a combination of drive generated by motors on the undercarriage and the use of conventional nosewheel gear steering, which however requires operation of all the systems required for steering, for example hydraulics and electrics. Nor is it possible, moreover, with the proposed devices and systems to achieve efficient boosting of the braking system, for, while a certain braking effect is achieved by the polarity reversal of the wheel motors or by other measures, the relief on the main braking systems is however not sufficient to stop heating of the main brakes to their operating temperature and the need for cooling on the ground so as to make it possible for the aircraft to take off again in the shortest possible period of time.

SUMMARY OF THE INVENTION

It may thus be an object of the invention to provide a device or a system by means of which wheels of an undercarriage of an aircraft may be driven; in addition the braking effect may be improved, and automatic, semi-automatic or manual taxiing may be facilitated, while the additional weight on board the aircraft may be kept as low as possible. It may be a further object of the invention to provide a device or a system that may be able to optimally boost the main undercarriage brakes so that the time period between two flights may be reduced.

This object may be met by a powered wheel system for an aircraft comprising at least one undercarriage including at least two rotatably held wheels, two or more motors with at least one motor coupled to at least one of the wheels; and at least one control device that is coupled to the motors. The control device is equipped to control operation of the motors independently of each other as far as their respective rotary speeds and direction of rotation are concerned. Advantageous improvements are also stated herein. Furthermore, the object may be met by a method for driving wheels of an aircraft, by the use thereof, and by an aircraft including at least one undercarriage with several rotatably held wheels. The method comprises driving, independently of each other, at least one of at least two motors, which in each case are coupled to at least one wheel disposed on the undercarriage of an aircraft to control their respective rotary speeds and direction of rotation based on input from a control device.

The core of the powered wheel system according to the invention is a control device. This control device is connected to one or several motors whose rotary speed and direction of rotation may be controlled by the control device. The control device is preferably designed so that it may provide a number of different functions that are based on various input data.

The control device is, for example, designed so that prior to the aircraft landing it drives one or several wheels of the undercarriage or of the undercarriages in order to minimise the landing shock during landing. In this arrangement the motors are made to rotate at a particular rotary speed that may be calculated from various input data. For the purpose of calculating the rotary speed the control device receives, for example, data relating to the true airspeed (TAS) of the aircraft, its speed of vertical descent, its angle of attack and the like. This data is provided, in particular, by an inertial reference system, an air data system and a flight management system. The resulting rotary speeds of the wheels should preferably provide wheel circumference speeds that correspond to the landing speed.

Furthermore, the powered wheel system according to the invention is able, after landing and during the braking procedure, to boost the main undercarriage brakes by means of the motors. To this effect the control device obtains, for example, data relating to the aircraft weight, the state of the braking system, and the length and state of the runway from the aforesaid systems as well as from the braking system and steering system. Based on this data a kind of desired rotary speed in reverse may be calculated, which, for example if electric motors are used, results in a rotary frequency of the magnetic field. While the wheels continue to rotate in forward direction during the braking procedure, an anti-torque is however generated by the opposite rotary field of the electric motors, which anti-torque acts against the rotation of the wheels. In addition, in the calculation of the desired rotary speeds the state of the runway may be taken into account to the extent that no slip occurs as a result of excessive additional anti-torque.

Moreover, the powered wheel system according to the invention is preferably able to drive the wheel or wheels of the aircraft for the purpose of effecting the taxiing procedure. This not only makes possible forward movement of the aircraft on the taxiway in order to take up its takeoff position, but for example also push-back of the aircraft. Preferably, the taxiing procedure is driven and controlled by corresponding input means in the cockpit of the aircraft, and is monitored by the control device. However, it is also imaginable to effect the taxiing procedure using external control means, i.e. control means that are not located on board the aircraft, and optionally to couple said taxiing procedure to a satellite-based or radio-based navigation system.

To provide improved boosting of the main braking system after the braking procedure, the powered wheel system according to the invention is preferably also in a position to selectively decouple the motor or motors from the wheels to be driven, and to connect said motor or motors to fans that make it possible to cool down friction-based braking means. Consequently, the cooling-down time of the main brakes is reduced so that the aircraft may be more quickly readied for the next flight. In addition, decoupling of the motors from the wheels may be done without if the aircraft, for example, after landing moves to a predetermined parking position. However, when said parking position has been reached, decoupling the motors from the wheels will become necessary.

Furthermore, the powered wheel system according to the invention may preferably be used to precisely measure the roll speed of the wheel or the wheels of the aircraft in that the rotary speed of the motors is acquired. If electrical motors are used, which may, for example, be designed as brushless motors, coil signals that arise during rotation of the motors could be evaluated with the use of corresponding electronics or a function within the control device, in order to obtain feedback relating to the motor speed without separate tachometer signals.

Lastly, the powered wheel system according to the invention also makes it possible to actively steer wheels of the undercarriage or undercarriages, for example in that two wheels of an undercarriage, which wheels are arranged parallel to each other, are driven at different rotary speeds so that the difference in the rotary speeds results in a change of direction of the aircraft on the ground. If a particular drive line is desired, which, for example, is in the shape of a circular arc, the wheel that is on the outside relative to the centre of the circular arc needs to be driven at a higher rotary speed than the wheel on the inside. Calculation of the necessary rotary speeds is effected taking into account the geometric parameters of the aircraft, which, for example, include the space between the wheels to be steered, and the diameter of the wheels.

If electric motors are used, these motors obtain their electrical power, for example, from the engine generators, from an APU generator, from a fuel cell or from batteries.

Overall, the powered wheel system according to the invention provides a number of different functions that result in a significantly simplified taxiing procedure and in optimal boost of the main undercarriage brakes. The different functions are interlinked by a shared control device. In this arrangement the control device is used as an interface to other aircraft systems and to one or several operating systems in the cockpit or outside the aircraft. In this arrangement the individual motors used in the undercarriage or undercarriages are used in a multifunctional manner so that the additional weight of the wheel drive motors does not result in carrying out a single function only. In the state of the art only partial functions are carried out by wheel drive motors, which are, however, not able to provide the extent as described above.

BRIEF DESCRIPTION OF THE DRAWINGS

Below, the invention is explained in more detail with reference to figures. In the figures the same reference characters are used for identical items. The following are shown.

DETAILED DESCRIPTION

Figure 1:
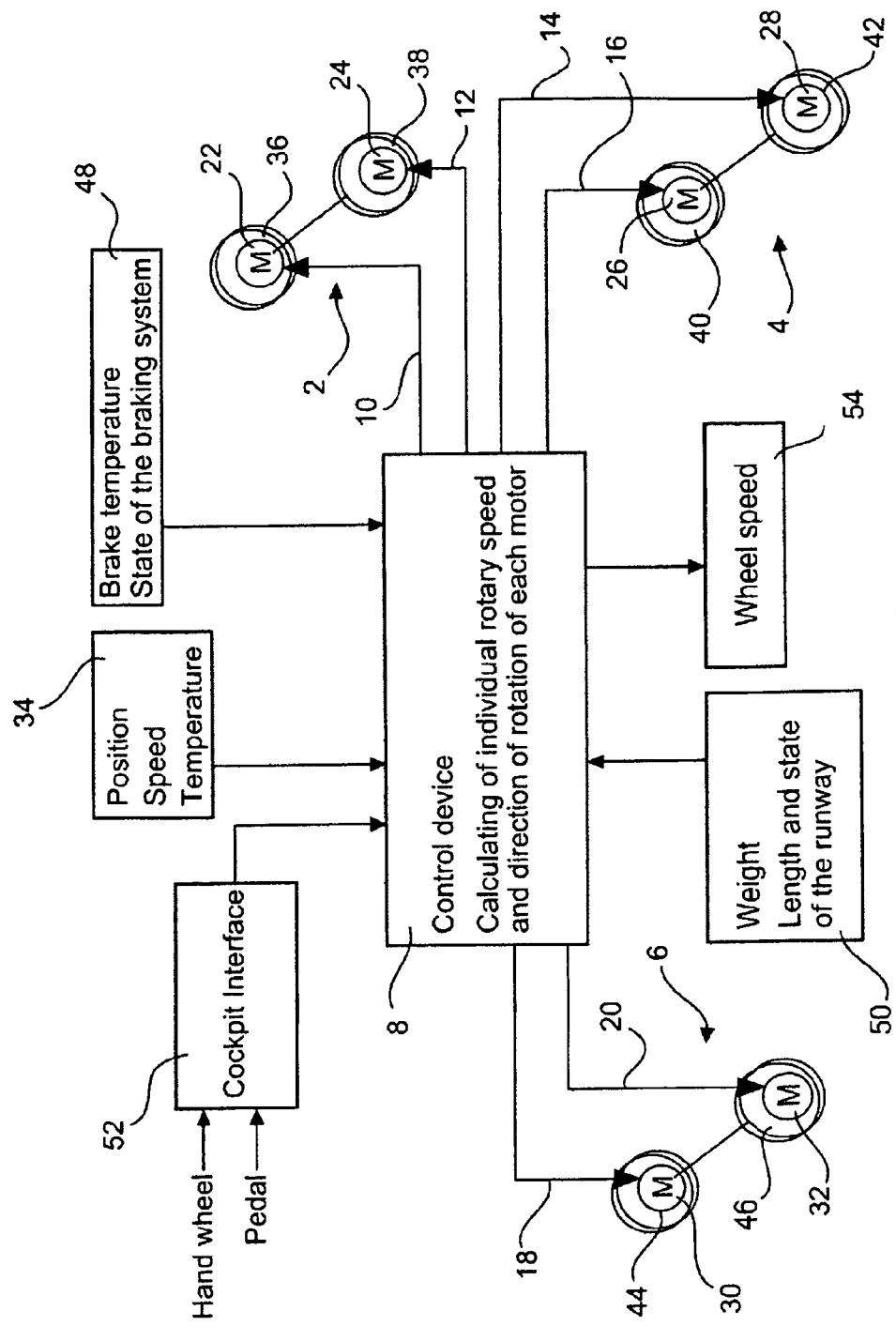
FIG. 1: a diagrammatic view of the powered wheel system according to the invention in the form of a block flow diagram.

The following description of FIG. 1 refers to the exemplary embodiment of a passenger aircraft that comprises a main undercarriage that is arranged in the region of the wing root, as well as a steerable nosewheel gear. Since FIG. 1 explains the powered wheel system according to the invention in an exemplary manner with reference to an example, the main undercarriage 2 comprises a pair 2 of wheels that are arranged side by side (right-hand side of the aircraft) and a pair 4 of wheels (left-hand side of the aircraft), as well as a pair 6 of wheels on the nosewheel gear. Of course any further embodiments may be implemented in which larger numbers of wheels or pairs of wheels or undercarriages are provided.

The core piece of the powered wheel system according to the invention is a control device 8 which in order to carry out its specific tasks consumes data from other aircraft systems and is equipped to emit signals 10 to 20 to motors 22 to 32, which signals cause the respective motor 22 to 32 to assume the desired operational behaviour. The control device according to the invention may, for example, receive data/input from an inertial reference system, an air data system, a flight management system and a braking- and steering system. In an exemplary manner, block 34 shows data relating to the position and speed of the aircraft, as well as to the air temperature at the time. The data relating to the position of the aircraft comprises, for example, the angle of attack of the aircraft, while the data relating to the speed of the aircraft comprises, for example, the speed of vertical descent and the true air speed. By means of this data it is possible to determine a desired rotary speed of undercarriage wheels 36 to 46, which speed should be reached by the motors 22 to 32 during the landing procedure and immediately prior to touchdown of the wheels 36 to 46 in order to reduce the landing shock to the aircraft. To this effect the wheel circumference speeds should essentially be identical to the landing speed.

It should be pointed out that the signals 10-20 may be present in analog or digital form. If digital signals 10-20 are transmitted from the control device 8 to the motors 22-32, in each case control units close to the motors are necessary, which control units interpret the received signals 10-20 accordingly and make it possible to directly drive the motors 22-32. If electric motors are used, the control units may be integrated on or in the motors 22-32; in the case of brushless motors integration may also be in the actual motor electronics. The digital control data may, for example, comprise specifications relating to rotary speeds, coupling- or decoupling commands and the like. Generally speaking, the control units not only support motor control, but also, for example, transmission of reaction signals, status signals and maintenance signals.

Immediately upon landing, when all the wheels 36 to 46 have touched down, the braking procedure of the aircraft is initiated. In this procedure the main undercarriage brakes are activated, which brakes cause the aircraft to decelerate with the use of conventional friction-based braking means. Further data is required to boost the braking effect by means of the motors 22 to 32 so that the control device may transmit corresponding signals 10 to 20 to the motors 22 to 32. For this purpose, for example, the temperature of the brakes and the state of the braking system (represented by block 48) are determined, as is the basic data relating to the length and condition of the runway, as well as the weight of the aircraft (represented by block 50). The deceleration effect of the motors 22 to 32 takes place by means of antitorque, i.e. torque that is opposed to the direction of rotation of the wheels 36 to 46, which antitorque needs to be generated depending on the type of motors 22 to 32 that are used. For example, if electric motors are used, it is necessary to let the rotary field within the electric motors 22 to 32 rotate such that at a rotary speed of the motors 22 to 32 at a given time anti-torque may arise at all. This is implemented by a desired rotary speed that is, for example, transmitted to the motor electronics. Such a desired rotary speed could be present in the reverse direction so that an anti-torque arises as a result of the corresponding rotation of the magnetic field. Brushless direct-current motors, which, for example, comprise permanent magnets comprising samarium-cobalt, are particularly suitable electric motors. By means of suitable motor control electronics, which are integrated in the motors 22 to 32, a rotary field for a forward- or reverse direction of rotation is generated.

When the aircraft is taxiing, corresponding signals 10 to 20 cause the individual motors 22 to 32 to rotate, in particular, in forward direction, except for steering manoeuvres while the aircraft is stationary or the like during which differential rotation of the respective wheels of a steerable undercarriage also provides for a wheel to rotate in reverse direction. In cases where the aircraft leaves a parking position, the motors 22 to 32 should, in particular, be made to rotate in reverse direction. The rotary speed of the motors 22 to 32 may, for example, be determined by control means that are connected to the control device 8 by means of a cockpit interface 52. It should be pointed out especially that taxiing of the aircraft does not depend on the conventional nosewheel gear steering, but instead may be brought about by a corresponding differential rotary speed of the two wheels 44 and 46 of the nosewheel gear. In order to support such a steering procedure, it is furthermore also imaginable for the wheels 36 to 42 of the main undercarriage to also assume different rotary speeds so that it is possible to travel along curved taxiways or drive lines without there being slip, and thus tyre wear as a result of friction, on one or several of the wheels 36 to 46.

In order to support taxiing, precise measuring of the ground speed of the aircraft is required, which speed may also be acquired by the powered wheel system according to the invention. To this effect it would be possible, for example, in the case of electric motors to use motor electronics designed for this purpose, which motor electronics, from electrical motor parameters ("coil signals") may acquire the precise rotary speed of the respective motor. By way of the geometric parameters of the respective wheel, the rotary speed of the wheel, which rotary speed has been determined, may be converted to a roll speed, which by way of an interface 54 may be provided to some other aircraft system.

For the purpose of cooling down the main undercarriage brakes the powered wheel system according to the invention makes it possible to decouple the motors 22 to 32 from the corresponding wheels 36 to 46 and to couple fans or fan wheels (not shown in FIG. 1), which are located in close proximity to the braking means of the undercarriages. In particular during forward movement following landing, it is imaginable for the wheels 36 to 46 and the fans for brake cooling to be driven concurrently. When the parking position has been reached, the motors 22 to 32 are preferably decoupled from the wheels 36 to 46 and for a certain time, or taking into account the brake temperature to be achieved, continue the cooling process.

The proposed integrated multifunctional powered wheel system is not limited to the above description with reference to the exemplary embodiment of FIG. 1, but instead any arrangements of undercarriages of a host of different aircraft are imaginable, without leaving the scope of protection of the claims that define the powered wheel system. The use of electric motors is not mandatory; other types of motors are also imaginable, for example hydraulic, pneumatic or other types. Furthermore, in particular cases it may be advantageous if not all the wheels of the undercarriages of an aircraft are driven, but instead only some of them. This may moreover reduce the additional weight to be carried, while nevertheless the majority of the described functions may be implemented. Control of the powered wheel system according to the invention preferably takes place by means of control input within the cockpit, for example with the use of a hand wheel, pedal, control stick or the like.

Figure 2:
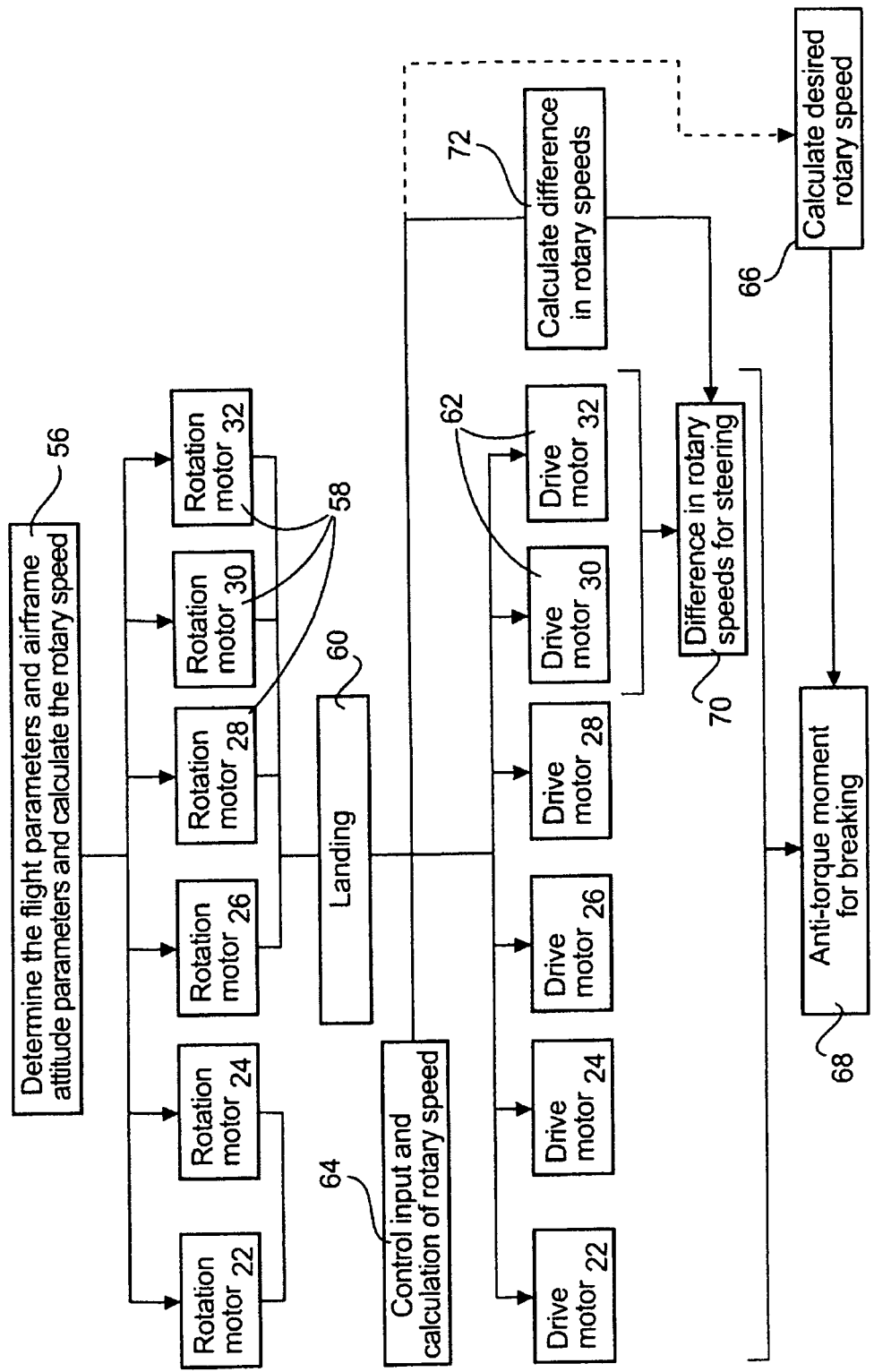
FIG. 2: a block flow diagram of the method according to the invention.

FIG. 2 shows a method according to the invention for driving wheels of an aircraft. The diagram starts with the determination 56 of aircraft and position parameters from the corresponding aircraft systems, for example the inertial reference system so that the landing speed, the wheel circumference speed to be set, and thus the rotary speed of the wheels 36-46 may be determined, and the motors 22-32 may be rotated 58 accordingly. After the landing 60 the motors 22-32 are driven 62 depending on the function to be carried out, wherein driving takes place in particular on the basis of control input 64. If the main brakes of the undercarriages are to be boosted by the powered wheel system according to the invention, calculation 66 of a desired rotary speed of the motors 22-32 by the control device 8 is necessary, and finally an anti-torque arises. Lastly, in the case of steering procedures 70 calculation 72 of the differential rotary speed of, for example, the motors 30 and 32 of the nosewheel gear 6 is necessary.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

2 Main undercarriage (right-hand side)
4 Main undercarriage (left-hand side)
6 Nosewheel gear
8 Control device
10-20 Signals to motors
22-32 Motors
34 Flight data or airframe attitude data
36-46 Wheels
48 Brake temperature, state of the braking system (data to the control device)
50 Aircraft weight, length and state of the runway (data to the control device)
52 Cockpit interface—signal transfer from control means to the control device
54 Wheel speed for transfer to further aircraft systems
56 Determination of flight parameters and attitude parameters, calculation of the rotary speed prior to landing
58 Rotation of the motors prior to landing
60 Landing
62 Driving the motors on the ground 64 Entry of control input, calculation of the individual motor speeds
66 Calculation of a desired rotary speed for brake boost
68 Anti-torque for braking
70 Difference in the rotary speed for steering
72 Calculating the difference in the rotary speed for steering

The invention claimed is:

1. A powered wheel system for an aircraft, comprising:
   two or more undercarriages, each of the two or more undercarriages including:
   at least two rotatably held wheels, and two or more motors, with each motor coupled to a respective one of the at least two wheels; and
   at least one control device coupled to at least two of the two or more motors of each of the two or more undercarriages; and
   an evaluation unit;
   wherein the control device is equipped to control the respective rotary speeds or directions of rotation of the two or more motors of each of the two or more undercarriages independently of each other;
   wherein the coupling between the at least one of the two or more motors of the respective undercarriage and the respective one of the at least two wheels of the respective undercarriage is configured to be selectively undone or maintained during operation of the aircraft; and
   wherein the evaluation unit is configured to determine, from the rotation of at least one of the two or more motors of a respective one of the two or more undercarriages, the rotary speed of the other of the two or more motors of the respective one of the two or more undercarriages or the roll speed of the aircraft.

2. The powered wheel system of claim 1,
   wherein the control device is equipped for driving at least two of the two or more motors of each of the two or more undercarriages with a difference in their respective rotary speeds or a difference in their respective directions of rotation relative to each other for steering the aircraft when situated on the ground.

3. The powered wheel system of claim 2,
   wherein a steering movement results from a control input to the control device, and
   the control device is equipped to calculate the difference in the respective rotary speeds of at least two of the two or more motors of at least one of the two or more undercarriages which is necessary with reference to the geometric variables of the aircraft and of the at least one of the two or more undercarriages.

4. The powered wheel system of claim 1,
   wherein the control device is equipped, for the purpose of reducing the landing shock, to drive the two or more motors of at least one of the two or more undercarriages to rotate in the forward direction immediately prior to the aircraft landing, and
   wherein the control device is configured to calculate the necessary rotary speed, taking into account true air speed data and airframe attitude data.

5. The powered wheel system of claim 1,
   wherein the control device is equipped, for the purpose of boosting brakes of the aircraft, to drive the two or more motors of at least one of the two or more undercarriages for generating torque that acts against the direction of roll, and
   wherein the control device calculates the motor control variables that are necessary, taking into account the roll speed, the state of a runway and the length of the runway.

6. The powered wheel system of claim 1,
   wherein at least one of the two or more motors of at least one of the two or more undercarriages is configured to be coupled to at least one fan wheel for cooling at least one of the brakes of the aircraft.

7. The powered wheel system of claim 1,
   wherein the at least one of the two or more motors of the respective at least one of the two or more undercarriages is coupled to the respective one of the at least two wheels of the respective at least one of the two or more undercarriages by way of a disengageable mechanical clutch.

8. The powered wheel system of claim 1,
   wherein the control device is equipped to drive at least two of the two or more motors of at least one of the two or more undercarriages for moving the aircraft in forward- and reverse-directions on the ground, wherein the respective rotary speeds and the respective directions of rotation of the two or more motors of the at least one of the two or more undercarriages are calculated on the basis of control input in the cockpit or from the outside.

9. The powered wheel system of claim 1,
   wherein at least one of the two or more motors of at least one of the two or more undercarriages comprises an electric motor operated by a member selected from the group consisting of an engine generator, an auxiliary power unit, a fuel cell, an external power supply and a battery.

10. The powered wheel system of claim 1,
    wherein the evaluation unit is located externally of or is integrated in the at least one of the two or more motors of the respective one of the two or more undercarriages.

11. The powered wheel system of claim 1,
    wherein at least one of the two or more motors of at least one of the two or more undercarriages comprises a hydraulic motor or a pneumatic motor.

12. The powered wheel system of claim 1,
    wherein the two or more motors of at least one of the two or more undercarriages are integrated in hubs of the at least two wheels of the at least one of the two or more undercarriages.

13. The powered wheel system of claim 1,
    wherein the control device is configured to transmit digital signals to the two or more motors of each of the two or more undercarriages, and
    wherein the signals transmitted to the two or more motors of each of the two or more undercarriages are received by at least one control unit and are converted to control variables for the two or more motors of each of the two or more undercarriages.

14. The powered wheel system of claim 1,
    wherein the control device is configured to transmit analog signals to the two or more motors of each of the two or more undercarriages.

15. A method for driving wheels of an aircraft including two or more undercarriages each with at least two rotatably held wheels and at least two motors disengageably coupled to respective ones of the at least two rotatably held wheels, the method comprising:
    driving, independently of each other, at least one of the at least two motors of each of the two or more undercarriages to control their respective rotary speeds or their respective directions of rotation based on input from a control device; and
    determining, by an evaluation unit, from the rotation of at least one of the two motors of a respective one of the two or more undercarriages, the rotary speed of the other of the two motors of the respective one of the two or more undercarriages or the roll speed of the aircraft;

wherein the coupling between the at least one of the at least two motors of a respective undercarriage and the respective one of the at least two rotatably held wheels of the respective undercarriage is configured to be selectively undone or maintained during operation of the aircraft.

16. The method of claim 15, further comprising driving the at least two motors of each of the two or more undercarriages by the control device with a difference in at least one of the respective rotary speeds and the respective directions of rotation thereof for the purpose of steering the aircraft while situated on the ground.

17. The method of claim 16, further comprising calculating by the control device the difference in the at least one of the respective rotary speeds and the respective directions of rotation which is necessary, with reference to the geometric variables of the aircraft and of the two or more undercarriages.

18. The method of claim 16, further comprising driving by the control device, for the purpose of reducing the landing shock, at least two motors of at least one of the two or more undercarriages to rotate in the forward direction immediately prior to the aircraft landing; and calculating by the control device the necessary rotary speed, with reference to the true airspeed data and airframe attitude data.

19. The method of claim 15, further comprising driving by the control device, for boosting brakes of the aircraft, two or more of the at least two motors of at least one of the two or more undercarriages for the purpose of generating torque that acts against the direction of roll; and calculating by the control device the necessary motor control variables, taking into account at least the roll speed, the state and the length of a runway.

20. An aircraft comprising a powered wheel system, the powered wheel system comprising:

two or more undercarriages, each of the two or more undercarriages including:

at least two rotatably held wheels, and two or more motors, with each motor coupled to a respective one of the at least two wheels;

at least one control device coupled to at least two of the two or more motors of each of the two or more undercarriages; and an evaluation unit;

wherein the control device is equipped to control the respective rotary speeds or directions of rotation of the two or more motors of each of the two or more undercarriages independently of each other;

wherein the coupling between the at least one of the two or more motors of the respective undercarriage and the respective one of the at least two wheels of the respective undercarriage is configured to be selectively undone or maintained during operation of the aircraft; and wherein the evaluation unit is configured to determine, from the rotation of at least one of the two or more motors of a respective one of the two or more undercarriages, the rotary speed of the other of the two or more motors of the respective one of the two or more undercarriages or the roll speed of the aircraft.

21. A powered wheel system for an aircraft, comprising:

at least one nosewheel gear undercarriage;

at least one main undercarriage; and an evaluation unit;

each of the at least one nosewheel gear undercarriage and the at least one main undercarriage including:

first and second rotatably held wheels, and first and second motors, with the first motor of the at least one nosewheel gear undercarriage coupled to the first rotatably held wheel of the at least one nosewheel gear undercarriage and the second motor of the at least one nosewheel gear undercarriage coupled to the second rotatably held wheel of the at least one nosewheel gear undercarriage, and the first motor of the at least one main undercarriage coupled to the first rotatably held wheel of the at least one main undercarriage and the second motor of the at least one main undercarriage coupled to the second rotatably held wheel of the at least one main undercarriage; and at least one control device coupled to the first and second motors of each of the at least one nosewheel gear undercarriage and each of the at least one main undercarriage;

wherein the control device is equipped to control operation of each of the first and second motors of each of the at least one nosewheel gear undercarriage and the at least one main undercarriage independently of each other;

wherein the evaluation unit is configured to determine, from the rotation of at least one of the first and second motors of a respective one of the at least one nosewheel gear undercarriage and the at least one main undercarriage, the rotary speed of the other of the first and second motors of the respective one of the at least one nosewheel gear undercarriage and the at least one main undercarriage or the roll speed of the aircraft.

22. The powered wheel system of claim 21, wherein the control device is equipped to control operation of each of the first and second motors of each of the at least one nosewheel gear undercarriage and the at least one main undercarriage independently of each other with regard to their respective rotary speeds or their respective directions of rotation.

23. The powered wheel system of claim 21, wherein the control device is configured to drive the first and second motors of the at least one nosewheel gear undercarriage with a difference in at least one of the respective rotary speeds and the respective directions of rotation thereof relative to each other; and wherein the control device is adapted configured to drive the first and second motors of the at least one main undercarriage with a difference in at least one of the respective rotary speeds and the respective directions of rotation thereof relative to each other.

* * * * *